US012646869B2

(12) United States Patent
Luo et al.

(10) Patent No.: US 12,646,869 B2
(45) Date of Patent: Jun. 2, 2026

(54) BUS BAR SUBASSEMBLY AND ELECTRICAL ASSEMBLY

(71) Applicants: Tyco Electronics (Shanghai) Co., Ltd., Shanghai (CN); Cisco Technology, Inc., San Jose, CA (US)

(72) Inventors: Jie (Roger) Luo, Shunde (CN); Hongqiang (Sean) Han, Shanghai (CN); Jiaoyong (Mac) Liu, Shanghai (CN); YuQiang (Thomas) Zhao, Shanghai (CN); Wei Qi, San Jose, CA (US); Xiaokang Zhu, San Jose, CA (US)

(73) Assignees: Cisco Technology, Inc., San Jose, CA (US); Tyco Electronics (Shanghai) Co., Ltd., Shanghai (CN)

( * ) Notice: Subject to any disclaimer, the term of this patent is extended or adjusted under 35 U.S.C. 154(b) by 284 days.

(21) Appl. No.: 18/486,189

(22) Filed: Oct. 13, 2023

(65) Prior Publication Data

US 2024/0291180 A1 Aug. 29, 2024

Related U.S. Application Data

(63) Continuation of application No. PCT/CN2022/086302, filed on Apr. 12, 2022.

(30) Foreign Application Priority Data

Apr. 13, 2021 (CN) ........................ 202110396134.X

(51) Int. Cl.
*H01R 12/52* (2011.01)
*H01R 12/72* (2011.01)

(52) U.S. Cl.
CPC ........... *H01R 12/52* (2013.01); *H01R 12/728* (2013.01)

(58) Field of Classification Search
CPC .. H01R 12/52; H01R 12/728; H01R 12/7088; H01R 25/162; H05K 1/144;
(Continued)

(56) References Cited

U.S. PATENT DOCUMENTS 5,259,784 A 11/1993 Iwatare et al.
6,561,821 B1 * 5/2003 Yu .......................... H01R 12/52 439/74
(Continued)

FOREIGN PATENT DOCUMENTS

CN 104094680 A 10/2014
CN 104638399 A 5/2015
(Continued)

OTHER PUBLICATIONS

Notification of Transmittal of International Search Report and Written Opinion dated Jun. 28, 2022, corresponding to Application. No. PCT/CN2022/086302, 10 pages.

*Primary Examiner* — Travis S Chambers
(74) *Attorney, Agent, or Firm* — Barley Snyder

(57) ABSTRACT

A bus bar subassembly adapted to connect a first circuit board and a second circuit board includes a first bus bar, a second bus bar and a first electrical connector. The first bus bar is electrically connected to the first circuit board. The second bus bar is electrically connected to the second circuit board. The first connector is electrically connected to the first bus bar and the second bus bar.

20 Claims, 6 Drawing Sheets

(58) Field of Classification Search
CPC ... H05K 2201/042; H05K 2201/10189; H05K 2201/10272; H05K 3/366
See application file for complete search history.

(56) References Cited

U.S. PATENT DOCUMENTS

| | | | | |
|---|---|---|---|---|
| 9,425,602 | B2 | 8/2016 | Nagai et al. | |
| 10,581,196 | B2 | 3/2020 | Liu et al. | |
| 2008/0220630 | A1* | 9/2008 | Sipe | H01R 12/7082 439/74 |
| 2012/0295453 | A1* | 11/2012 | Cipolla | H05K 1/144 174/257 |
| 2013/0210246 | A1* | 8/2013 | Davis | H01R 12/7082 439/607.05 |
| 2013/0303003 | A1* | 11/2013 | Tsang | H05K 1/144 439/74 |
| 2023/0137275 | A1* | 5/2023 | Morgan | H01R 13/73 439/65 |
| 2023/0163528 | A1* | 5/2023 | Gieski | H01R 12/7082 439/59 |

FOREIGN PATENT DOCUMENTS

| | | | | | |
|---|---|---|---|---|---|
| CN | 206163761 | U | | 5/2017 | |
| CN | 108736197 | A | * | 11/2018 | H01R 12/7082 |
| CN | 111373608 | A | | 7/2020 | |
| CN | 112072353 | A | | 12/2020 | |
| TW | M538266 | U | * | 3/2017 | H01R 12/73 |
| TW | 202308234 | A | * | 2/2023 | H05K 7/1492 |
| WO | 2019099829 | A1 | | 5/2019 | |

* cited by examiner

BUS BAR SUBASSEMBLY AND ELECTRICAL ASSEMBLY

CROSS-REFERENCE TO RELATED APPLICATION

This application claims the benefit of International Application No. PCT/CN2022/086302, filed Apr. 12, 2022, and Chinese Patent Application No. CN 202110396134.X filed on Apr. 13, 2021, in the China National Intellectual Property Administration, the whole disclosures of which are incorporated herein by reference.

FIELD OF THE INVENTION

Embodiments of the present disclosure relate to a bus bar subassembly, and more particularly, to a bus bar subassembly used between orthogonal printed circuit boards and multiple printed circuit boards in a data center, and to an electrical assembly including the bus bar subassembly.

BACKGROUND

At present, in related art, the transmission of large DC current between printed circuit boards (PCBs) is generally achieved via a connector-and-wire combination scheme or a connector-and-connector combination scheme. However, known connector-and-wire combination schemes are affected by a bending radius of the wire, which requires certain available space and has a relatively large volume. As a result, these schemes often block air ducts, and are more troublesome during on-site maintenance operation. In addition, the relative vibration between PCBs or the system accumulated tolerance can easily lead to poor match of the connectors. Further still, the connector on the PCB is often required to be arranged too close to the edge of the PCB.

SUMMARY

According to an embodiment of the present disclosure, a bus bar subassembly adapted to connect a first circuit board and a second circuit board includes a first bus bar, a second bus bar and a first electrical connector. The first bus bar is electrically connected to the first circuit board. The second bus bar is electrically connected to the second circuit board. The first connector is electrically connected to the first bus bar and the second bus bar, respectively.

BRIEF DESCRIPTION OF THE DRAWINGS

The invention will now be described by way of example with reference to the accompanying Figures, of which.

DETAILED DESCRIPTION OF THE EMBODIMENTS

Figure 1:
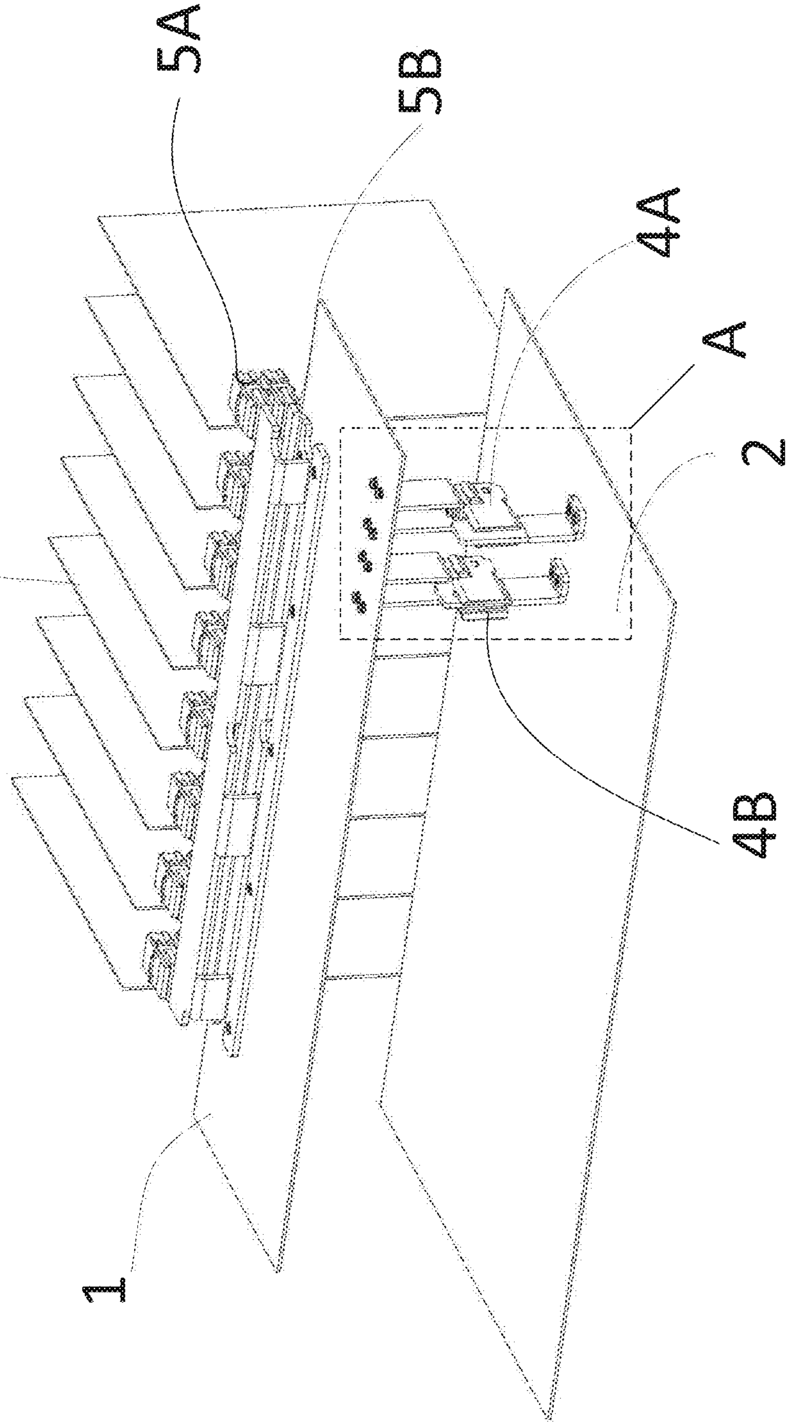
FIG. 1 is a schematic perspective view showing an electrical assembly according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to one embodiment of the present disclosure, a bus bar subassembly for connecting a first circuit board and a second circuit board includes a first bus bar, a second bus bar and a first electrical connector. The first bus bar is electrically connected to the first circuit board. The second bus bar is electrically connected to the second circuit board. The first connector is electrically connected to the first bus bar and the second bus bar, respectively.

According to another embodiment of the present disclosure, an electrical assembly includes a first circuit board, at least one second circuit board, and at least one first bus bar subassembly connecting the first circuit board and the second circuit board, respectively. The first bus bar subassembly includes a first bus bar electrically connected to the first circuit board, a second bus bar electrically connected to the second circuit board and a first connector electrically connected to the first bus bar and the second bus bar, respectively.

Figure 2:
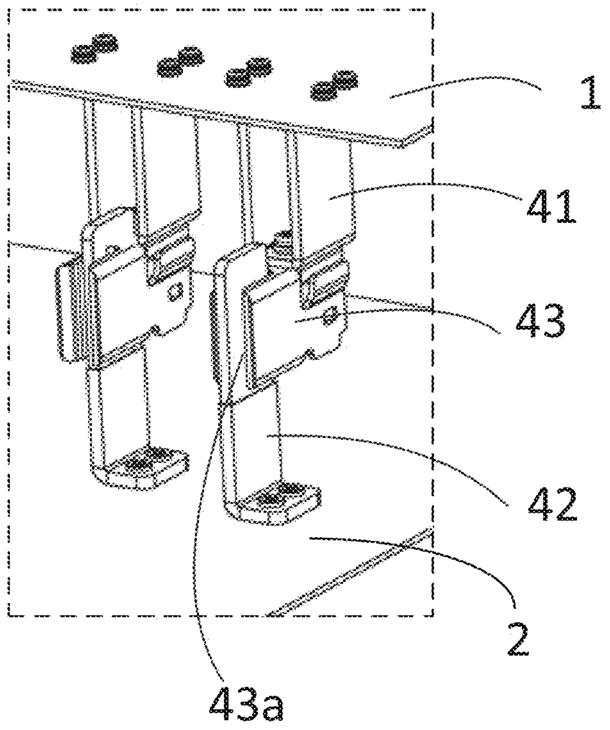
FIG. 2 is an enlarged view showing part A of FIG. 1.
Figure 3:
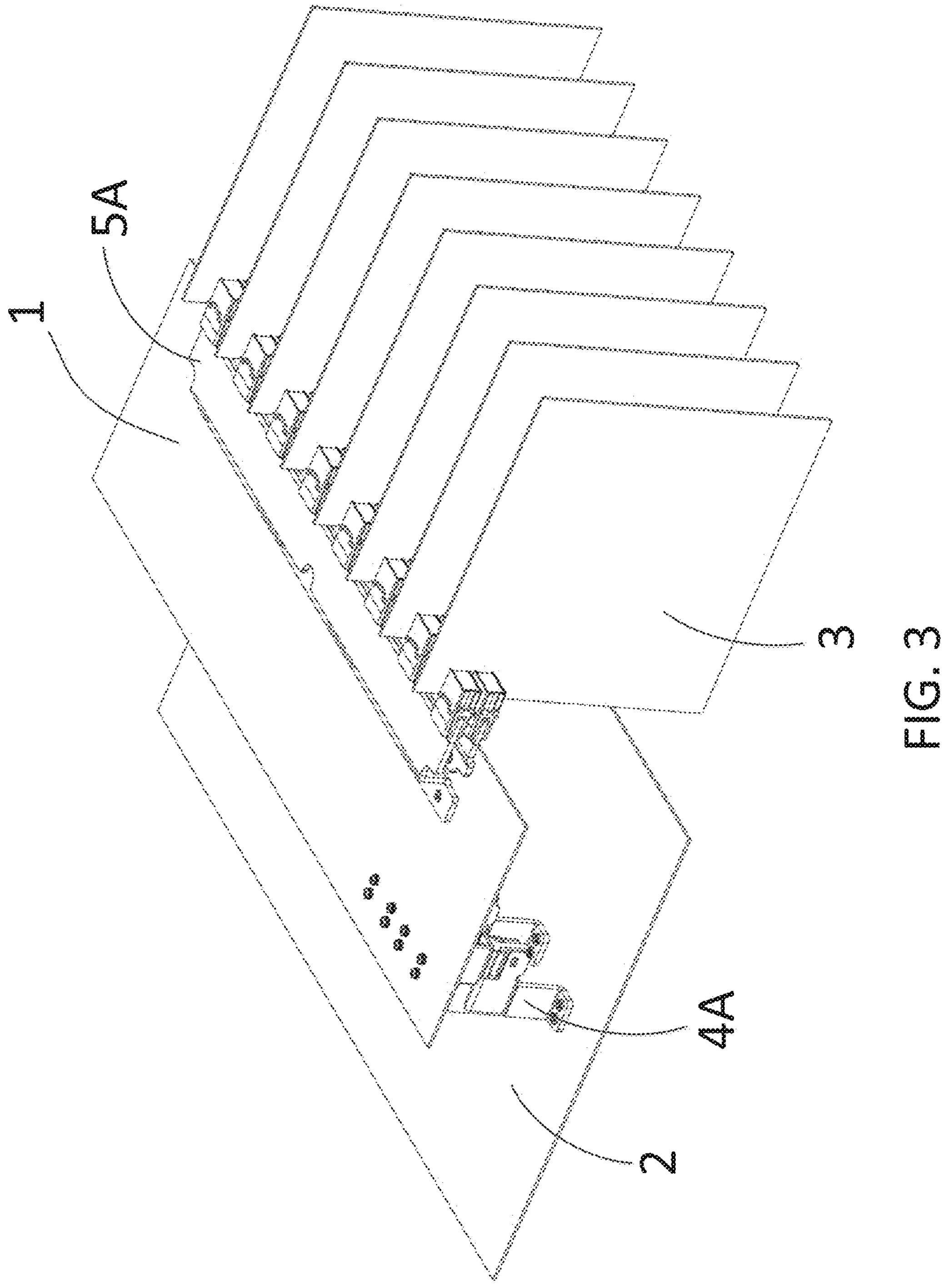
FIG. 3 is another schematic perspective view showing the electrical assembly of FIG. 1.
Figure 4:
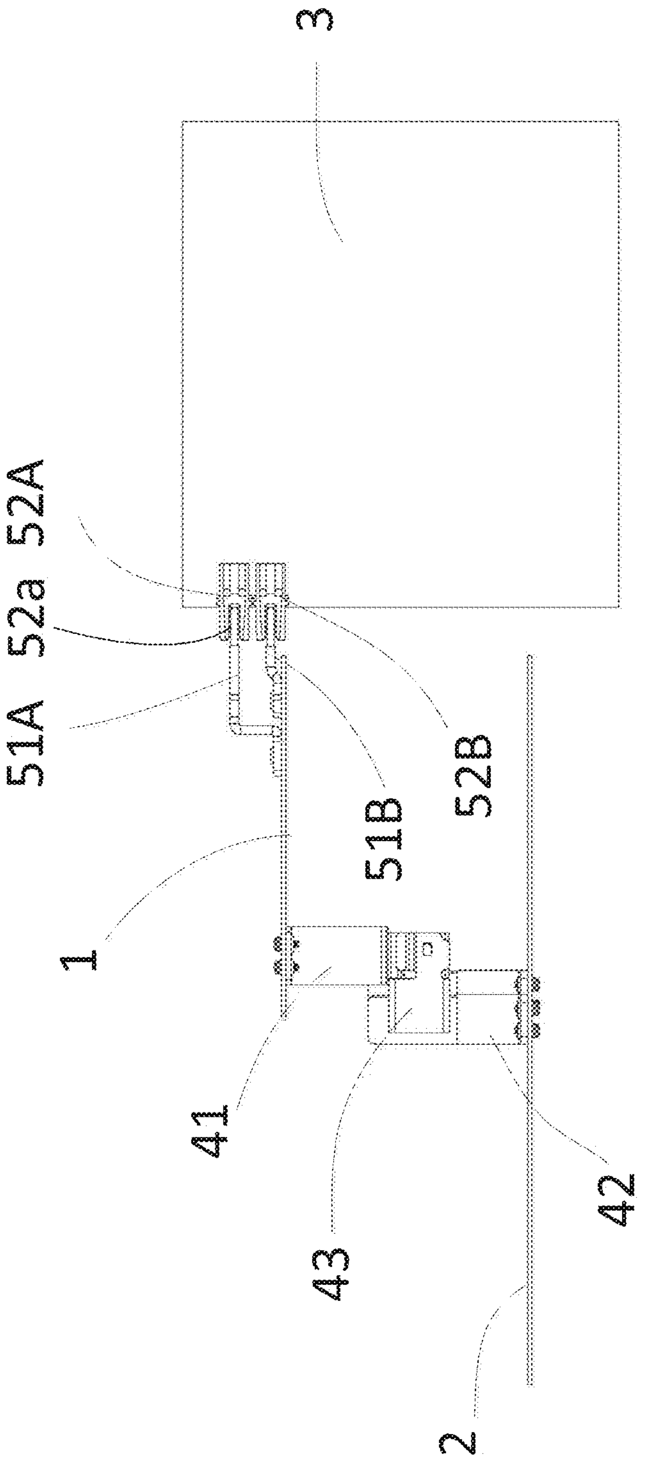
FIG. 4 is a side view showing an electrical assembly according to an exemplary embodiment of the present disclosure.
Figure 5:
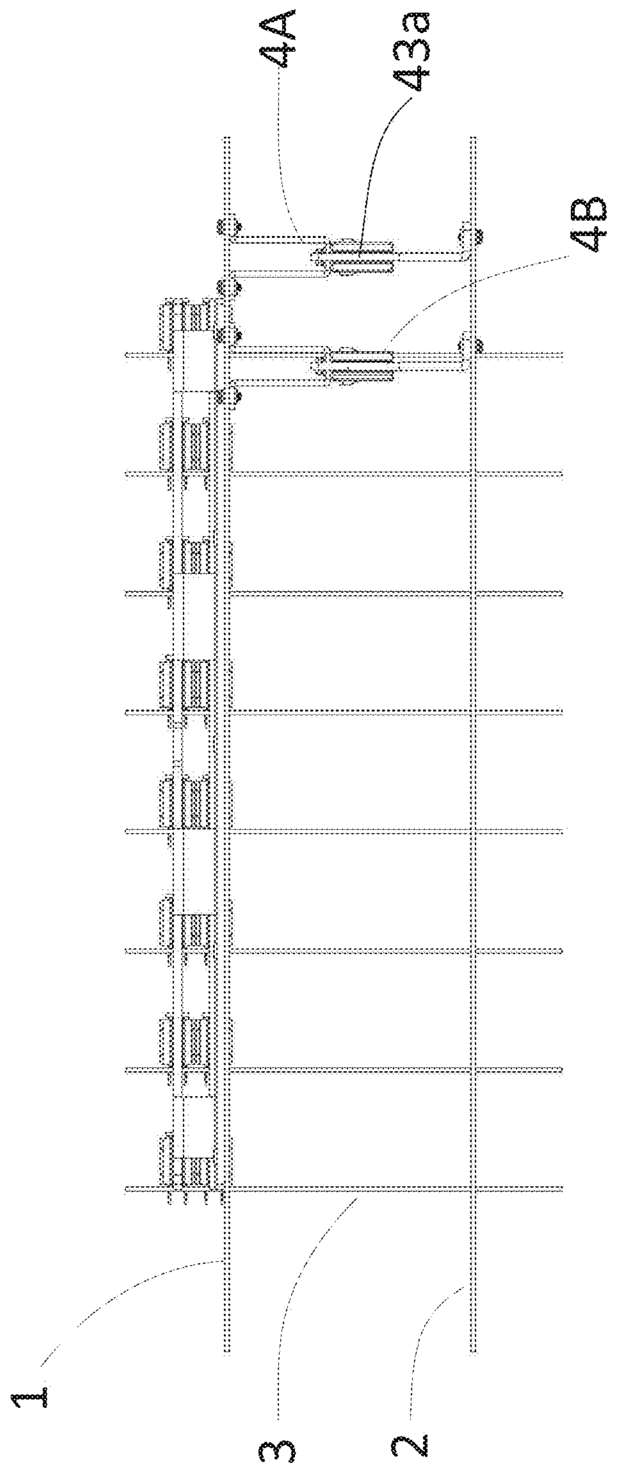
FIG. 5 is a schematic structural view showing an electrical assembly according to an exemplary embodiment of the present disclosure.
Figure 6:
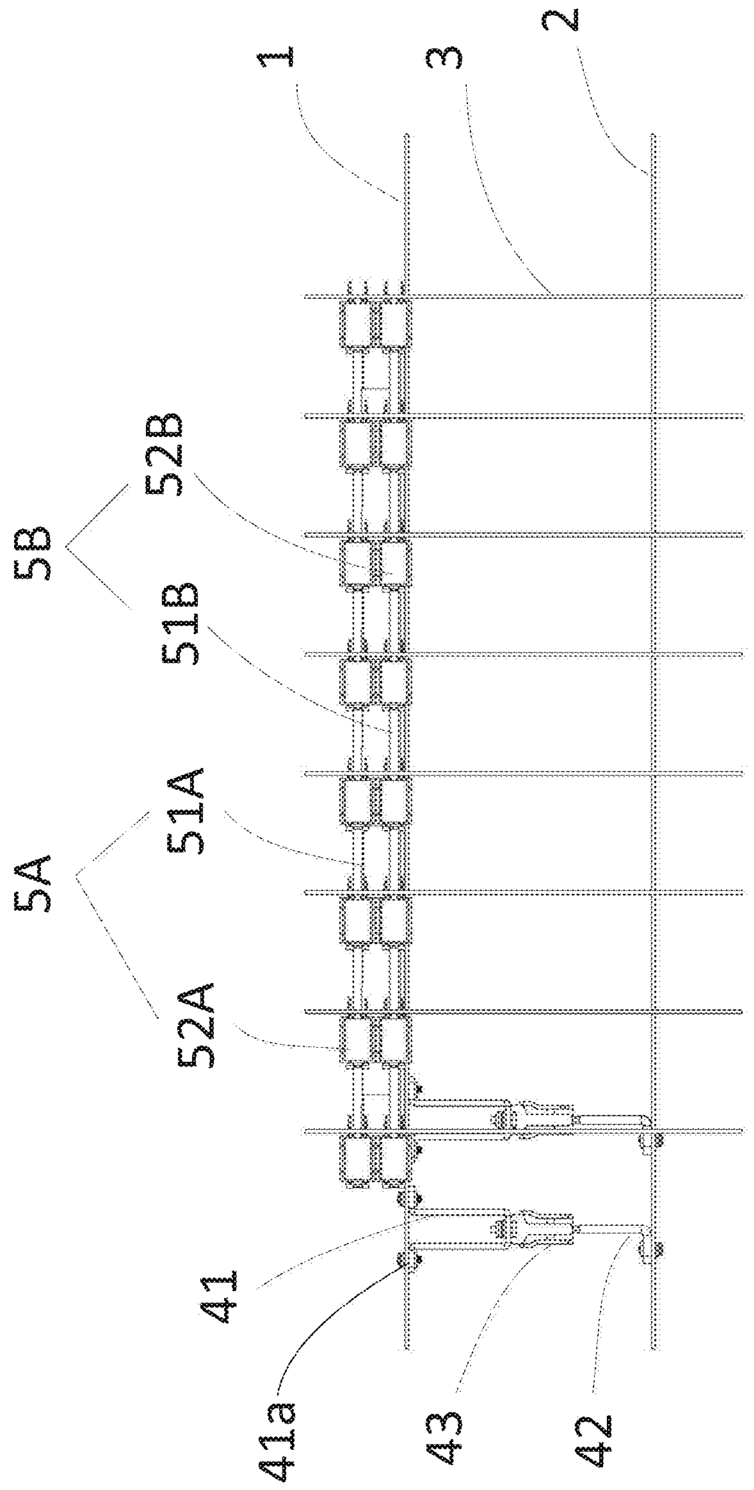
FIG. 6 is another schematic structural view showing an electrical assembly according to an exemplary embodiment of the present disclosure.

FIG. 1 is a schematic perspective view showing an electrical assembly according to an exemplary embodiment of the present disclosure. FIG. 2 is an enlarged view showing part A of FIG. 1. FIG. 3 is another schematic perspective view showing the electrical assembly of FIG. 1. FIG. 4 is a side view showing an electrical assembly according to an exemplary embodiment of the present disclosure. FIG. 5 is a schematic structural view showing an electrical assembly according to an exemplary embodiment of the present disclosure. FIG. 6 is another schematic structural view showing an electrical assembly according to an exemplary embodiment of the present disclosure.

As shown in FIGS. 1-6, the electrical assembly according to exemplary embodiments of the present disclosure includes one first circuit board 1, one second circuit board 2 and at least one first bus bar subassembly 4A, 4B. The first bus bar subassembly 4A, 4B electrically connects to the first circuit board 1 and the second circuit board 2, respectively, so that a DC current is transmitted from the first circuit board 1 to the second circuit board 2. The bus bar subassembly 4A, 4B can electrically connect the two circuit boards together so as to reduce a space occupied by them, facilitate assembly and maintenance, and reduce positioning requirements. In addition, different circuit board spacing can be adapted by changing a size specification of the bus bar subassembly 4A, 4B.

In one exemplary embodiment, the second circuit board 2 is parallel to the first circuit board 1. However, in some other embodiments of the present disclosure, the second circuit board 2 may also have an angle relative to the first circuit board 1. A number of the first bus bar subassembly 4A, 4B is two, and the two first bus bar subassemblies 4A, 4B serve as a positive first bus bar subassembly 4A and a negative first bus bar subassembly 4B, respectively, so that a positive and negative DC current is transmitted from the first circuit board 1 to the second circuit board 2. Each first bus bar subassembly 4A, 4B includes a first bus bar 41, a second bus bar 42, and a first connector 43. The first bus bar 41 is electrically connected to the first circuit board 1. The second bus bar 42 is electrically connected to the second circuit board 2. The first connector 43 is electrically connected to the first bus bar 41 and the second bus bar 42, respectively.

The first bus bar 41 may have a U-shaped structure, and the first bus bar 41 includes two side walls and a bottom wall connected to the two side walls, respectively. The first connector 43 is detachably (for example a bolted connection) electrically connected to the bottom wall, and the two side walls are detachably electrically connected to the first circuit board 1, respectively. A connection portion 41*a* adapted to be form a threaded connection with the first circuit board 1 is provided at a free end of the side wall. In particular, the connection portion 41*a* is provided with a through hole for a bolt to pass through and be in a threaded connection with the first circuit board 1.

The first connector 43 may be formed with a first slot 43*a*. The first slot 43*a* is configured to receive at least partially the second bus bar 42 and to be in electrical contact with the second bus bar 42 in a sliding manner along a direction perpendicular to the first circuit board 1. Thus, the accumulated tolerances of the electrical assembly in the direction parallel to the first circuit board 1 can be accommodated by adjusting a dimension of a portion of the second bus bar 42 inserted into the first slot 43*a* in the direction parallel to the first circuit board 1, and hot plug of the second circuit board, and more convenient on-site maintenance at the customer's site is achievable. Further, the accumulated tolerances of the electrical assembly in the direction perpendicular to the first circuit board 1 may be accommodated by sliding the first slot 43*a* on the second bus bar 42 in the direction perpendicular to the first circuit board 1 and may be adapted to different spacing between the first circuit board 1 and the second circuit board 2. Furthermore, on-site quick assembly, maintenance and replacement at the customer's site can be achieved by connecting the second bus bar 42 to the first connector 43 in an insertion manner.

In one exemplary embodiment, as shown in FIG. 1-6, the second bus bar 42 has a L-shaped structure. The second bus bar 42 includes a first arm detachably (for example a bolted connection) electrically connected to the second circuit board 2 and a second arm perpendicular to the first arm and configured to be inserted into the first slot 43*a* and be in electrical contact with the first slot 43*a* in a sliding manner.

A tin coating may be provided at a contact area of the first circuit board 1 with the first bus bar 41. A tin coating also may be provided at a contact area of the second circuit board 2 with the second bus bar 42. Thus, it can greatly simplify the layout and manufacturing cost of the circuit board while meeting its application requirements.

In one exemplary embodiment, the electrical assembly further includes eight third circuit boards 3 perpendicular to the first circuit board 1. In this case, the electrical assembly further includes at least one second bus bar subassembly 5A, 5B electrically connecting to the first circuit board 1 and the third circuit boards 3, respectively, so that the DC current is transmitted from the first circuit board 1 to the second circuit board 2. Each second bus bar subassembly 5 includes one third bus bar 51A (or 51B) and a plurality of second connectors 52A, 52B. The third bus bar 51A (or 51B) is extended parallel to the first circuit board 1 and has a first end detachably electrically connected to the first circuit board 1. Each of the third circuit boards 3 is electrically connected to a second end of the third bus bar 51A (or 51B) opposite to the first end via a respective one 52A (or 52B) of the second connectors.

The second connector 52A, 52B is formed with a second slot 52*a*, and the second slot 52*a* is configured to receive the second end of the third bus bar 51A, 51B and is configured to be in electrical contact with the third bus bar 51A, 51B in a sliding manner. Thus, the accumulated tolerances of the electrical assembly in the direction parallel to the first circuit board 1 can be accommodated by adjusting a dimension of a portion of the third bus bar 51A, 51B inserted in the second slot 52*a* in the direction parallel to the first circuit board 1, and hot plug of the third circuit board and more convenient on-site maintenance at the customer's site is achievable. Further, by sliding the second connectors 52A, 52B on the third bus bar 51A, 51B, the spacing between the third circuit boards 3 may be adjusted to avoid assembly problems caused by accumulated tolerances caused by the simultaneous use of the plurality of third circuit boards 3.

As shown in FIG. 1-5, the third bus bar 51A, 51B has a Z-shaped structure and includes a first portion close to the third circuit board 3 and parallel to the first circuit board 1, a second portion detachably connected to the first circuit board 1, and a third portion connected between the first portion and the second portion. The first portion is configured to be inserted into the second slot 52*a* and be in electrical contact with the second slot 52*a* in a sliding manner.

A number of the second bus bar subassembly 5A, 5B is two, and the two second bus bar subassemblies 5A, 5B serve as a positive second bus bar subassembly 5A and a negative second bus bar subassembly 5B, respectively, so that the positive and negative DC current is transmitted from the first circuit board 1 to the third circuit board 3.

The third bus bar 51A, 51B form a threaded connection with the first circuit board 1. A tin coating may also be provided at a contact area of the first circuit board 1 with the third bus bar 51A, 51B. Thus, it can greatly simplify the layout and manufacturing cost of the circuit board while meeting its application requirements.

It should be noted that, in some other embodiments of the present disclosure, only the second circuit board 2 or the third circuit board 3 are included. In addition, the number of the third circuit board 3 may not be limited to eight shown in the figures, for example, it can be one, two or three. That is, the specific number and layout of the second circuit board 2 and the third circuit board 3 may be designed according to specific circumstances.

In accordance with another aspect of the present disclosure, there is further provided the first bus bar 4A, 4B as described above.

According to the bus bar subassembly and the electrical assembly of the forgoing various exemplary embodiments of the present disclosure, the bus bar subassembly electrically connects the two circuit boards together, which reduces the space occupied thereby, facilitates assembly and maintenance, reduce positioning requirements and improves heat dissipation performance. In addition, the electrical assembly has good size compatibility and can accommodate the accumulated tolerances during machining or assembling. In addition, in the electrical assembly, different circuit board spacing can be adapted by changing the size specification of the bus bar subassembly.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A bus bar subassembly adapted to connect a first circuit board and a second circuit board, comprising:
- a first bus bar electrically adapted to be connected to the first circuit board, the first bus bar has a U-shaped structure including two side walls and a bottom wall connected to the two side walls, the two side walls adapted to be detachably electrically connected to the first circuit board;
- a second bus bar electrically adapted to be connected to the second circuit board; and
- a first connector detachably electrically connected to the bottom wall of the first bus bar, and electrically connected to the second bus bar.

2. The bus bar subassembly according to claim 1, wherein the first bus bar and the second bus bar are adapted to orient the first circuit board parallel to the second circuit board.

3. The bus bar subassembly according to claim 1, wherein a connection portion adapted to be removably attached to the first circuit board is provided at a free end of at least one of the two side walls.

4. The bus bar subassembly according to claim 1, wherein the first connector defines a first slot at least partially receiving the second bus bar.

5. The bus bar subassembly according to claim 4, wherein the first slot is adapted to be in electrical contact with the second bus bar in a sliding manner along a direction perpendicular to the first circuit board.

6. The bus bar subassembly according to claim 5, wherein the second bus bar has a L-shaped structure, including:
- a first arm adapted to be detachably electrically connected to the second circuit board; and
- a second arm perpendicular to the first arm and inserted into the first slot in an electrically contacting manner.

7. An electrical assembly comprising:
- a first circuit board;
- at least one second circuit board; and
- at least one first bus bar subassembly connecting to the first circuit board and the second circuit board, including:
  - a first bus bar electrically connected to the first circuit board;
  - a second bus bar electrically connected to the second circuit board; and
  - a first connector electrically connected to the first bus bar and the second bus bar, the first connector formed with a first slot at least partially receiving, and forming electrical contact with, the second bus bar in a sliding manner along a direction perpendicular to the first circuit board.

8. The electrical assembly according to claim 7, wherein the second circuit board is parallel to the first circuit board.

9. The electrical assembly according to claim 8, wherein a number of the first bus bar subassembly is two, including a positive first bus bar subassembly and a negative first bus bar subassembly.

10. The electrical assembly according to claim 7, wherein:
- the first bus bar has a U-shaped structure including two side walls and a bottom wall connected to the two side walls;
- the first connector is detachably electrically connected to the bottom wall; and
- the two side walls are detachably electrically connected to the first circuit board.

11. The electrical assembly according to claim 10, wherein a connection portion threadably connected to the first circuit board is provided at a free end of each of the two side walls.

12. The electrical assembly according to claim 7, wherein the second bus bar has a L-shaped structure, including:
- a first arm detachably electrically connected to the second circuit board; and
- a second arm perpendicular to the first arm and inserted into the first slot so as to be in electrical contact with the first slot in a sliding manner.

13. The electrical assembly according to claim 7, wherein at least one of:
- a tin coating is provided at a contact area between the first circuit board and the first bus bar; or
- a tin coating is provided at a contact area between the second circuit board and the second bus bar.

14. The electrical assembly according to claim 8, further comprising:
- a plurality of third circuit boards; and
- at least one second bus bar subassembly connecting to the first circuit board and the third circuit boards, respectively; the second bus bar subassembly including:
  - a third bus bar extending parallel to the first circuit board and having a first end detachably electrically connected to the first circuit board; and
  - a plurality of second connectors, each of the third circuit boards is electrically connected to a second end of the third bus bar opposite to the first end via a respective one of the second connectors.

15. The electrical assembly according to claim 14, wherein a number of the second bus bar subassembly includes a positive second bus bar subassembly and a negative second bus bar subassembly.

16. The electrical assembly according to claim 14, wherein the second connector defines a second slot receiving the second end of the third bus bar in an electrically contacting and sliding manner.

17. The electrical assembly according to claim 16, wherein the third bus bar has a Z-shaped structure and includes:

a first portion proximate one of the plurality of third circuit boards, and parallel to the first circuit board;

a second portion detachably connected to the first circuit board; and a third portion connected between the first portion and the second portion, the first portion inserted into the second slot and in electrical contact with the second slot in a sliding manner.

18. The electrical assembly according to claim 14, wherein a tin coating is provided at a contact area between the first circuit board and the third bus bar.

19. A bus bar subassembly adapted to connect a first circuit board and a second circuit board, comprising:

a first bus bar electrically adapted to be connected to the first circuit board, the first bus bar having a U-shaped structure including two side walls and a bottom wall connected to the two side walls;

a second bus bar electrically adapted to be connected to the second circuit board; and a first connector electrically connected to the first bus bar and the second bus bar.

20. An electrical assembly comprising:

a first circuit board;

at least one second circuit board;

at least one first bus bar subassembly connecting to the first circuit board and the second circuit board, including:

a first bus bar electrically connected to the first circuit board;

a second bus bar electrically connected to the second circuit board; and a first connector electrically connected to the first bus bar and the second bus bar;

a plurality of third circuit boards; and at least one second bus bar subassembly connecting to the first circuit board and the third circuit boards, respectively; the second bus bar subassembly including:

a third bus bar extending parallel to the first circuit board and having a first end detachably electrically connected to the first circuit board; and a plurality of second connectors, each of the third circuit boards is electrically connected to a second end of the third bus bar opposite to the first end via a respective one of the second connectors.

* * * * *